(12) United States Patent
Kim et al.

(10) Patent No.: US 8,998,761 B2
(45) Date of Patent: Apr. 7, 2015

(54) TRANSMISSION FOR HYBRID VEHICLE

(71) Applicant: Hyundai Motor Company, Seoul (KR)

(72) Inventors: Baekyu Kim, Suwon (KR); Kyungha Kim, Gyunggi-Do (KR); Yeonho Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/849,930

(22) Filed: Mar. 25, 2013

(65) Prior Publication Data

US 2014/0094335 A1   Apr. 3, 2014

Related U.S. Application Data

(62) Division of application No. 12/888,993, filed on Sep. 23, 2010, now Pat. No. 8,435,147.

(30) Foreign Application Priority Data

Nov. 12, 2009 (KR) ........................ 10-2009-0109078

(51) Int. Cl.
*F16H 3/66* (2006.01)
*B60K 6/36* (2007.10)
*B60K 6/365* (2007.10)
*B60K 6/445* (2007.10)
*B60K 6/547* (2007.10)
*B60W 10/02* (2006.01)
*B60W 10/06* (2006.01)
(Continued)

(52) U.S. Cl.
CPC .............. *B60K 6/547* (2013.01); *B60K 6/365* (2013.01); *B60K 6/445* (2013.01); *B60W 10/02* (2013.01); *B60W 10/06* (2013.01); *B60W 10/08* (2013.01); *B60W 10/101* (2013.01); *B60W 10/115* (2013.01); *B60W 20/00* (2013.01); *F16H 3/728* (2013.01); *F16H 2037/0866* (2013.01); *F16H 2037/102* (2013.01); *F16H 2037/103* (2013.01); *F16H 2037/104* (2013.01); *F16H 2037/106* (2013.01); *F16H 2200/0043* (2013.01); *F16H 2200/2007* (2013.01); *F16H 2200/2023* (2013.01); *Y02T 10/6239* (2013.01); *Y02T 10/6286* (2013.01); *Y10S 903/902* (2013.01)

(58) Field of Classification Search
USPC ................. 475/5, 280–290, 313, 319, 325
See application file for complete search history.

(56) References Cited

U.S. PATENT DOCUMENTS 6,962,545 B2 * 11/2005 Larkin ............................. 475/5
7,214,154 B2 * 5/2007 Klemen et al. .................. 475/5
(Continued)

FOREIGN PATENT DOCUMENTS

CN       201214375 Y    4/2009
EP       2 055 578 A2   5/2009
(Continued)

OTHER PUBLICATIONS

Chinese Office Action for Chinese Application No. 201010539462.2, dated May 30, 2014.

*Primary Examiner* — Roger Pang
(74) *Attorney, Agent, or Firm* — Mintz Levin Cohn Ferris Glovsky and Popeo, P.C.; Peter F. Corless

(57) ABSTRACT

A transmission for a hybrid vehicle is provided to implement one or more electric vehicle modes, two or more power split modes, and a plurality of fixed-gear ratio modes that can improve driving performance and fuel efficiency.

6 Claims, 12 Drawing Sheets

(51) Int. Cl.
  *B60W 10/08*    (2006.01)
  *B60W 10/101*   (2012.01)
  *B60W 10/115*   (2012.01)
  *B60W 20/00*    (2006.01)
  *F16H 3/72*     (2006.01)
  *F16H 37/08*    (2006.01)
  *F16H 37/10*    (2006.01)

(56) References Cited

U.S. PATENT DOCUMENTS

| | | | |
|---|---|---|---|
| 8,235,854 B2 * | 8/2012 | Seo et al. | 475/5 |
| 8,303,447 B1 * | 11/2012 | Kim et al. | 475/5 |
| 8,435,147 B2 * | 5/2013 | Kim et al. | 475/5 |
| 2009/0253544 A1 | 10/2009 | Foster et al. | |
| 2009/0275437 A1 * | 11/2009 | Kersting | 475/5 |
| 2009/0275438 A1 * | 11/2009 | Kersting | 475/5 |
| 2009/0275439 A1 * | 11/2009 | Kersting | 475/5 |
| 2011/0111907 A1 * | 5/2011 | Kim et al. | 475/5 |
| 2011/0111908 A1 * | 5/2011 | Kim et al. | 475/5 |

FOREIGN PATENT DOCUMENTS

| | | | |
|---|---|---|---|
| JP | 2001-082555 A | | 3/2001 |
| JP | 2004-353713 A | | 12/2004 |
| JP | 2005-238898 A | | 9/2005 |
| JP | 2007-314034 A | | 12/2007 |
| JP | 2007314034 A | * | 12/2007 |
| JP | 2008-114812 A | | 5/2008 |
| JP | 2009-090831 A | | 4/2009 |
| JP | 2009-120042 A | | 6/2009 |

* cited by examiner

FIG.3

| MODE | | CL1 | CL2 | BK1 | BK2 |
|---|---|---|---|---|---|
| EV MODE | EV 1 | | | ● | |
| | EV 2 | ● | | ● | |
| POWER SPLIT MODE | INPUT SPLIT | | | ● | |
| | COMPOUND SPLIT | ● | | | |
| FIXED GEARS | UD 1 | | ● | ● | |
| | UD 2 | | | ● | ● |
| | 1 : 1 | ● | ● | | |
| | OD | ● | | | ● |

FIG.12

| MODE | | CL1 | CL2 | BK1 | BK2 |
|---|---|---|---|---|---|
| EV MODE | EV 1 | | | ● | |
| POWER SPLIT MODE | INPUT SPLIT | | | ● | |
| | COMPOUND SPLIT | ● | | | |
| FIXED GEARS | UD | | ● | ● | |
| | 1 : 1 | ● | ● | | |
| | OD | ● | | | ● |

TRANSMISSION FOR HYBRID VEHICLE

CROSS-REFERENCE TO RELATED APPLICATIONS

The present application is a Divisional Application of U.S. patent application Ser. No. 12/888,993, filed Sep. 23, 2010, which claims priority to Korean Patent Application No. 10-2009-0109078 filed Nov. 12, 2009, the entire contents of which are incorporated herein by reference.

BACKGROUND OF THE INVENTION

1. Field of the Invention

The present invention relates to a transmission for a hybrid vehicle, in detail, a transmission for a hybrid vehicle having one or more electric vehicle (EV) mode, two power split modes, and multi-fixed gear ratio shift ranges.

2. Description of Related Art

Hybrid vehicles equipped with a hybrid transmission including an engine, a motor generator, and a planetary gear set can travel in an EV mode operated by only a motor usually at the start or low velocity and also in a power split mode allowing more efficiently using the power of the engine and the motor by operating the transmission as an electrically variable transmission (EVT) as the vehicle velocity increases. Further, the hybrid vehicles can use a fixed-gear ratio to improve power performance of the vehicles as in the existing transmissions. Systems based on this conception have contributed to maximize the idle stop function and regenerative brake and to improve fuel efficiency and power performance of vehicles.

Further, hybrid vehicles do not produce exhaust gas from the engine when being driven only by the motor generator and can operate the engine at the best fuel economy point, which is recognized as an environmental-friendly automobile technology having advantages of improving fuel economy and reducing exhaust gas.

The transmissions for the hybrid vehicles are designed to implement a variety of drive modes with a simpler configuration, such that, preferably, the vehicles can be efficiently driven while improving fuel economy and acceleration performance by switching the drive modes in accordance with the traveling conditions of the vehicles, thereby improving the driving performance.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

An aspect of the present invention provides a transmission for a hybrid vehicle, which includes a first differential gear set, a second differential gear set, a first motor generator, a second motor generator, a first fixing device, and a second fixing device. The first differential gear set has at least four rotary members, including a rotary member connected to an engine and two rotary members being able to be selectively connected with each other. The second differential gear set has at least three rotary members, including a rotary member continuously connected to a rotary member of the first differential gear set and another rotary member connected to an output member and selectively connected to another rotary member of the first differential gear set. The first motor generator is continuously connected to one rotary member of the first differential gear set other than the rotary member connected to the engine and the rotary members capable of being selectively connected with each other. The second motor generator is continuously connected to the rotary member of the second differential gear set continuously connected to the rotary member of the first differential gear set. The first fixing device is provided to restrict rotation of a rotary member of the second differential gear set not connected to the output member and the second motor generator. The second fixing device is provided to restrict rotation of one rotary member of the first differential gear set connected with the first motor generator.

Another aspect of the present invention provides a transmission for a hybrid vehicle, which includes a first planetary gear set, a second planetary gear set, a first fixing device, a second fixing device, a third torque transfer device, a fourth torque transfer device, a first motor generator, and a second motor generator. The first planetary gear set includes at least four rotary members, including a rotary member connected to an engine and two rotary members being able to be selectively connected with each other. The second planetary gear set includes at least three rotary members including a rotary member continuously connected to a rotary member of the first differential gear set and another rotary member connected to an output member and selectively connected to another rotary member of the first differential gear set. The first fixing device is provided to restrict rotation of a rotary member of the second planetary gear set other than the rotary member continuously connected to the rotary member of the first differential gear set and the rotary member connected to the output member and selectively connected to another rotary member of the first differential gear set. The second fixing device is provided to restrict rotation of a rotary member of the first planetary gear set other than the rotary members selectively connected with each other and the rotary member continuously connected with the rotary member of the second planetary gear set. The third torque transfer device is disposed to selectively connect and disconnect one rotary member of the first planetary gear set and one rotary member of the second planetary gear set. The fourth torque transfer device is disposed to selectively connect and disconnect two rotary members of the first planetary gear set. The first motor generator is connected to one rotary member of the first planetary gear set. The second motor generator is connected to one rotary member of the second planetary gear set.

With the transmissions of the present invention, fuel efficiency and driving performance of the vehicles can be improved.

The above and other features of the transmissions of the present invention will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 3 is a table showing operation modes implemented by the transmission of the first embodiment shown in FIG. 1.

FIG. 12 is a table showing operation modes implemented by the transmission of the second embodiment shown in FIG. 2.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
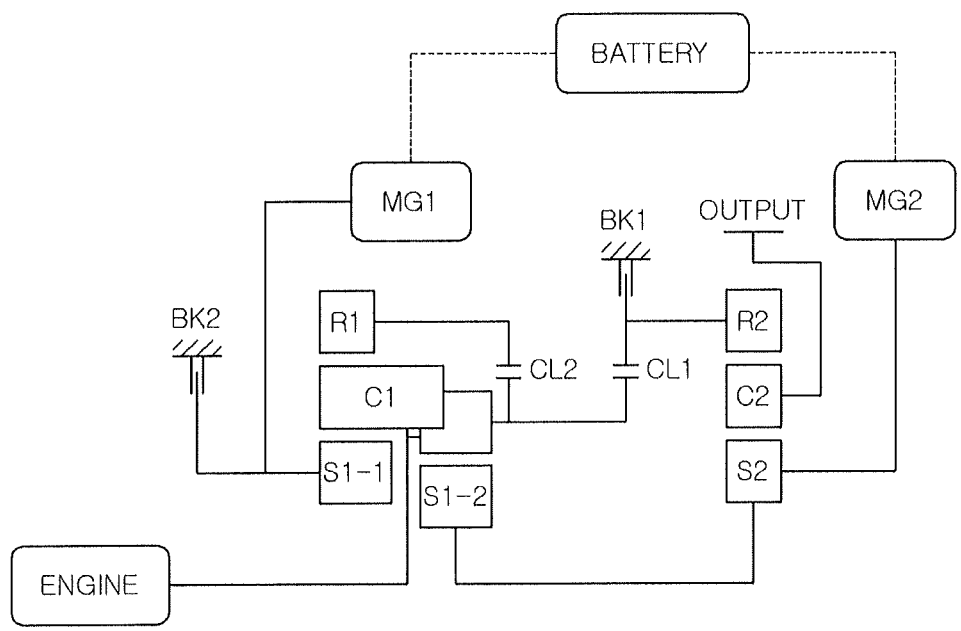
FIG. 1 is a diagram illustrating the configuration of a transmission for a hybrid vehicle according to a first embodiment of the present invention.
Figure 2:
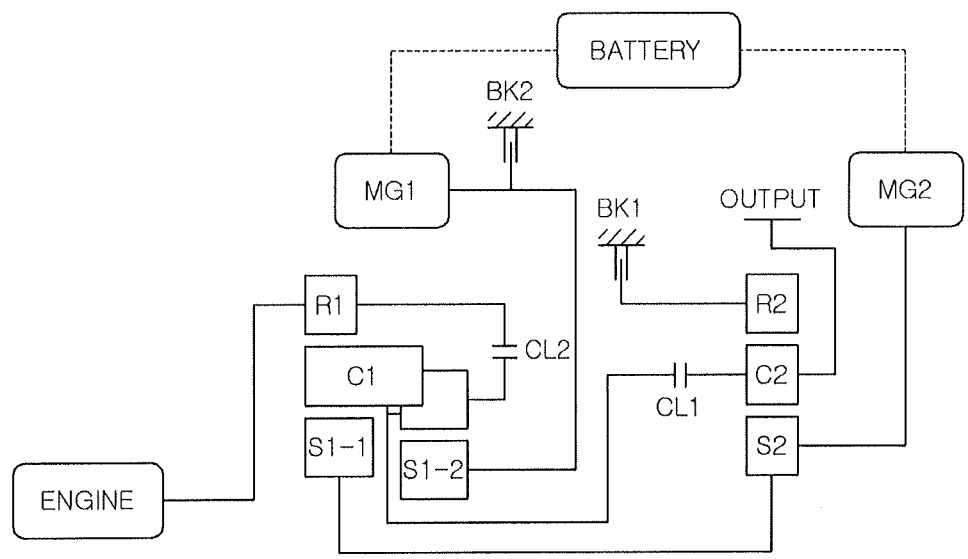
FIG. 2 is a diagram illustrating the configuration of a transmission for a hybrid vehicle according to a second embodiment of the present invention.

Referring to FIGS. 1 to 2, transmissions for a hybrid vehicle according to the first and second embodiments of the present invention commonly include a first differential gear set, a second differential gear set, a first motor generator MG 1, a second motor generator MG 2, a first fixing device, a second fixing device, a third torque transfer device, and a fourth torque transfer device.

The first differential gear set includes at least four rotary members. The rotary members include a rotary member connected to an engine ENGINE and two rotary members selectively connected with each other.

The second differential gear set includes at least three rotary members. The rotary members include a rotary member continuously connected to a rotary member of the first differential gear set and two rotary members each being connected to an output member OUTPUT, selectively connected to another rotary member of the first differential gear set, or both.

The first motor generator MG1 is continuously connected to a rotary member of the first differential gear set other than the rotary member connected to the engine ENGINE and the rotary members selectively connected with each other.

The second motor generator MG2 is continuously connected to the rotary member of the second differential gear set continuously connected to the rotary member of the first differential gear set.

The first fixing device is provided to restrict rotation of the rotary member of the second planetary gear set connected other than the rotary member connected to the output member OUTPUT and the rotary member connected to the second motor generator MG2.

The second fixing device is provided to restrict rotation of the rotary member of the first differential gear set connected with the first motor generator MG1.

The third torque transfer device is disposed to selectively connect or disconnect a rotary member of the second differential gear and a rotary member of the first differential gear set The fourth torque transfer device is disposed to selectively connect or disconnect two rotary elements of the first differential gear set.

Although it is described that the first differential gear set and the second differential gear set are implemented by planetary gear sets in these embodiments, they may also be implemented by other types of gear sets that make at least one gear have the weighted average velocity of the other two gears, using bevel gears etc.

Preferably, the first differential gear set is a revenue type planetary gear set and hereafter referred to as a first planetary gear set 1 and the second differential gear set is a simple planetary gear set and hereafter referred to as a second planetary gear set 2.

Preferably, the first planetary gear set 1 includes a first sun gear S1-1, a first sun gear S1-2, a first carrier C1, and a first ring gear R1 and the second planetary gear set 2 includes a second sun gear S2, a second carrier C2, and a second ring gear R2.

Preferably, the first fixing device and the second fixing device are a first brake BK1 and a second brake BK2 which can restrict rotation of the rotary members connected thereto, respectively, and the third torque transfer device and the fourth torque transfer device are a first clutch CL1 and a second clutch CL2 which can selectively connect and disconnect two rotary members that can relatively rotate.

Further, the second clutch CL2 is disposed to selectively connect and disconnect the first carrier C1 and the first ring gear R1 of the first planetary gear set 1, the first brake BK1 is disposed to restrict rotation of the second ring gear R2, and the second motor generator MG2 is continuously connected to the second sun gear S2, and the output member OUTPUT is connected to the second carrier C2.

According to the first embodiment of FIG. 1, the engine ENGINE is connected to the first carrier C1, the first motor generator MG1 is connected to the first sun gear S1-1, the first sun gear S1-2 is continuously connected to the second sun gear S2, the first clutch CL1 is disposed to selectively connect the first carrier C1 with the second ring gear R2, and the second brake BK2 is disposed to restrict rotation of the first sun gear S1-1.

On the other hand, according to the second embodiment of FIG. 2, the engine ENGINE is connected to the first ring gear R1, the first motor generator MG1 is connected to the first sun gear S1-2, the first sun gear S1-1 is continuously connected to the second sun gear S2, the first clutch CL1 is disposed to selectively connect the first carrier C1 with the second carrier C2, and the second brake BK2 is disposed to restrict rotation of the first sun gear S1-2.

The operation of the transmission according to the first embodiment of FIG. 1 is described with reference to FIGS. 3 to 11.

FIG. 3 is a table showing operation modes of the first embodiment of FIG. 1, which include a first EV mode (EV1), a second EV mode (EV2), an input split mode, a compound split mode, a first under drive fixed-gear mode (UD1), a second under drive fixed-gear mode (UD2), a 1:1 fixed-gear mode (1:1), and an over drive fixed-gear mode (OD).

Figure 4:
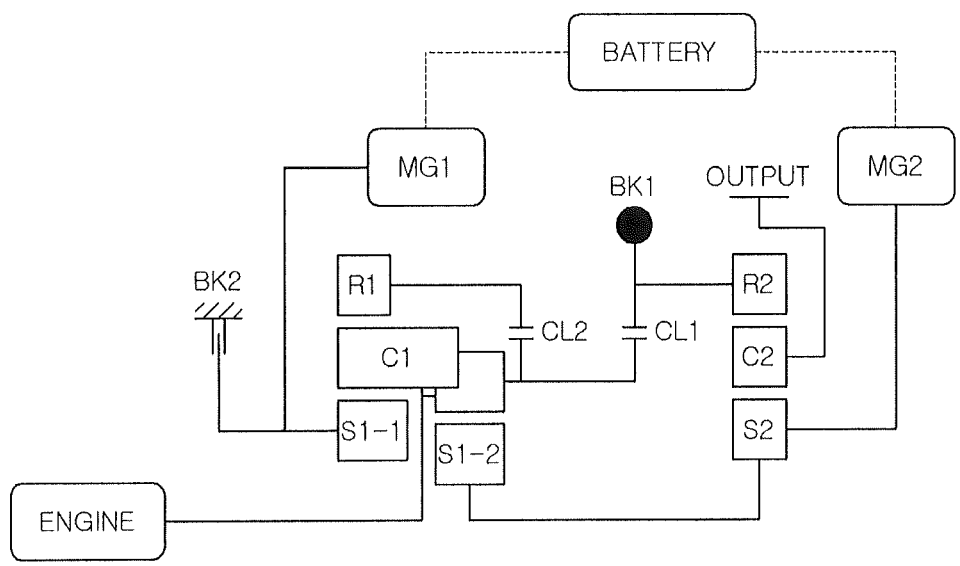
FIGS. 4 to 11 are configuration views and lever diagrams illustrating the drive conditions of a power train including the transmission shown in FIG. 1 under the operation modes shown in FIG. 3.
Figure 4:
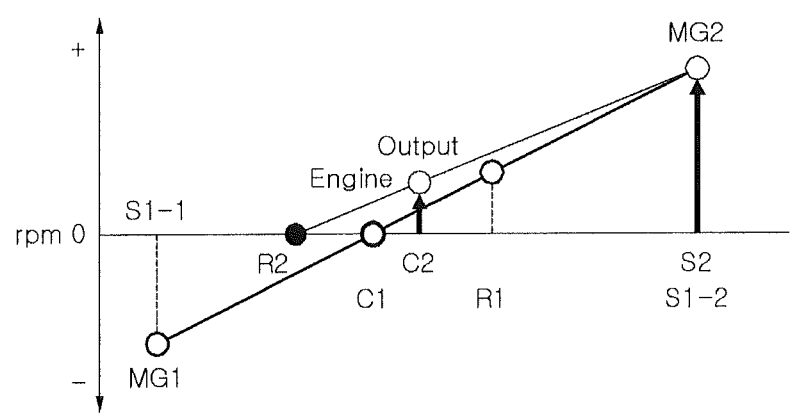

FIG. 4 shows the EV1 mode. The EV 1 mode is implemented by engaging the first brake BK1, in which the engine ENGINE is in stop.

In this mode, the second ring gear R2 is fixed by the first brake BK1. Accordingly, as the second motor generator MG2 drives the second sun gear S2, power is reduced across the second carrier C2 and outputted to the output member OUTPUT connected with the driving wheels.

In this operation, the first sun gear S1-2 is driven together with the second sun gear S2 by the second motor generator MG2 and the engine ENGINE is in stop. Accordingly, the first motor generator MG 1 is freely reversed by the first sun gear S11.

Figure 5:
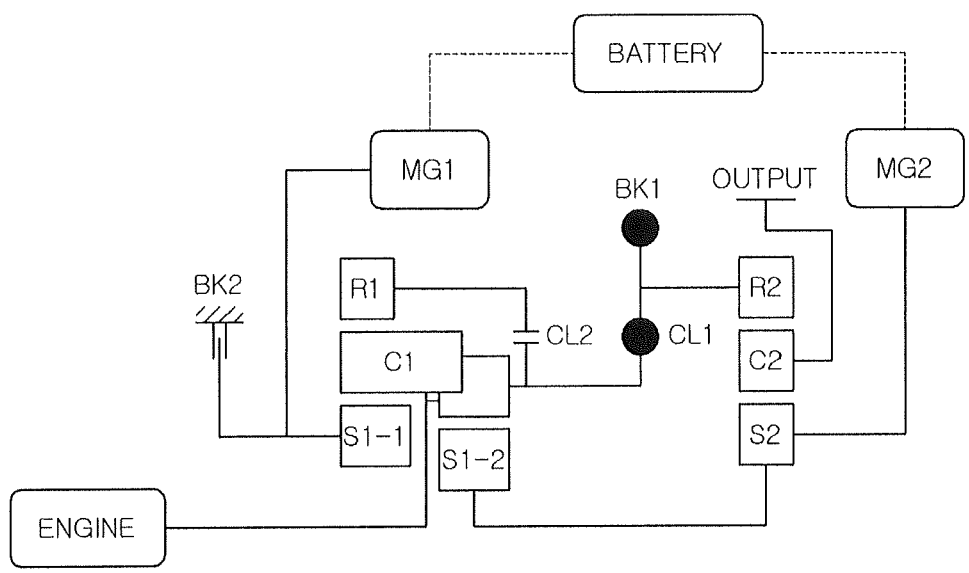
Figure 5:
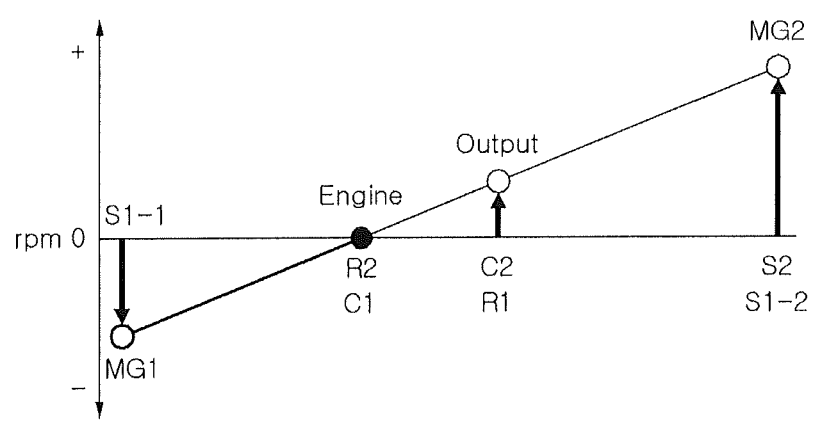

FIG. 5 illustrates the EV2 mode, which is implemented by engaging the first brake BK1 with the first clutch CL1.

The first planetary gear set 1 and the second planetary gear set 2 form one straight lever with two rotary members connected, by connecting the first clutch CL1, as shown in the figure, the second ring gear R2, the first carrier C1, and the engine ENGINE are fixed by the first brake BK1, and the first motor generator MG1 and the second motor generator MG2 output power through the second carrier C2 while being driven in the opposite directions to each other, as shown in the figure.

Therefore, the first motor generator MG1 and the second motor generator MG2 can be driven with higher efficiency than the EV1 mode, and as a result, this mode can improve fuel efficiency of the vehicle.

Figure 6:
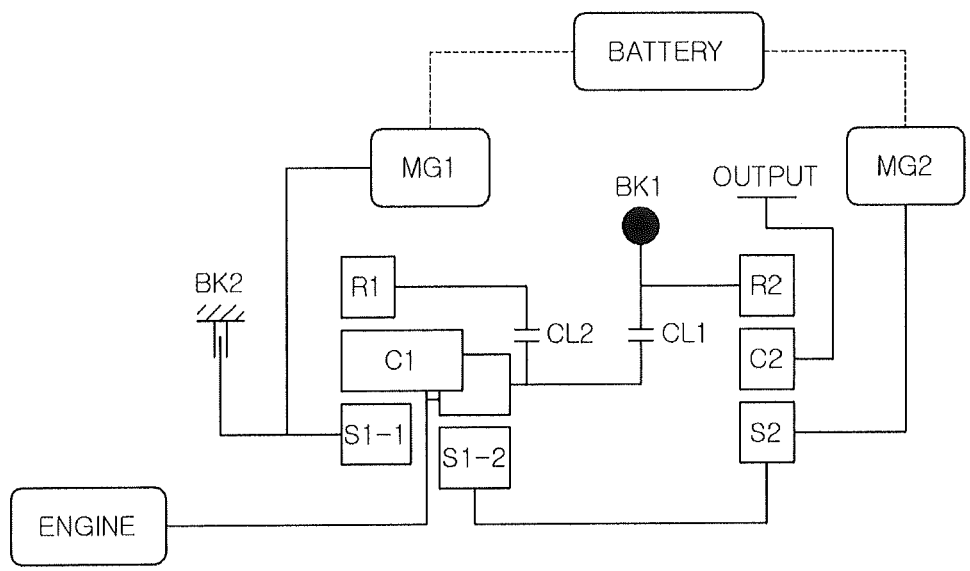
Figure 6:
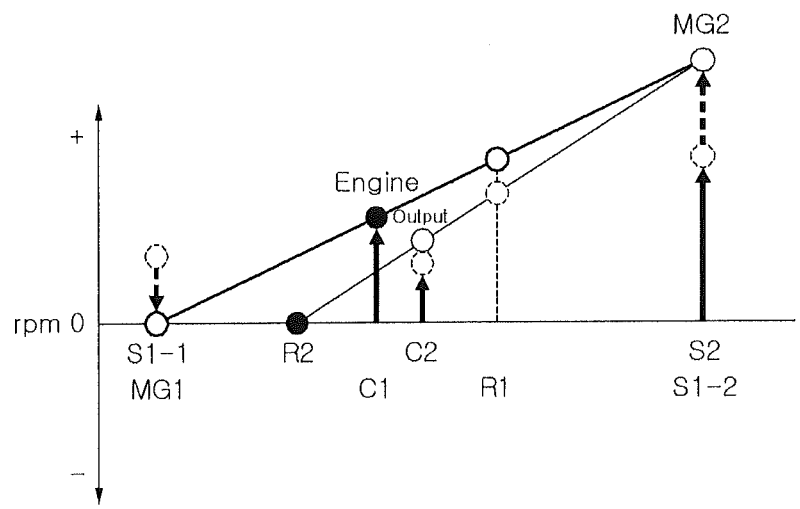

FIG. 6 illustrates the input split mode, in which the transmission operates as an EVT.

With only the first brake BK1 engaged, driving is performed by the power from the engine ENGINE and the power from the second motor generator MG2, and the first motor generator MG1 generates electricity, in accordance with circumstances.

Figure 7:
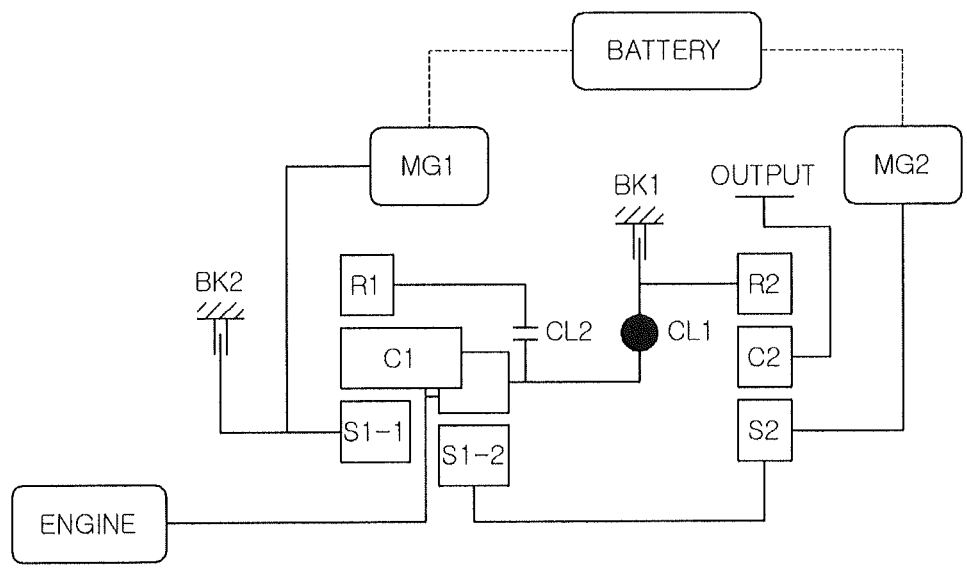
Figure 7:
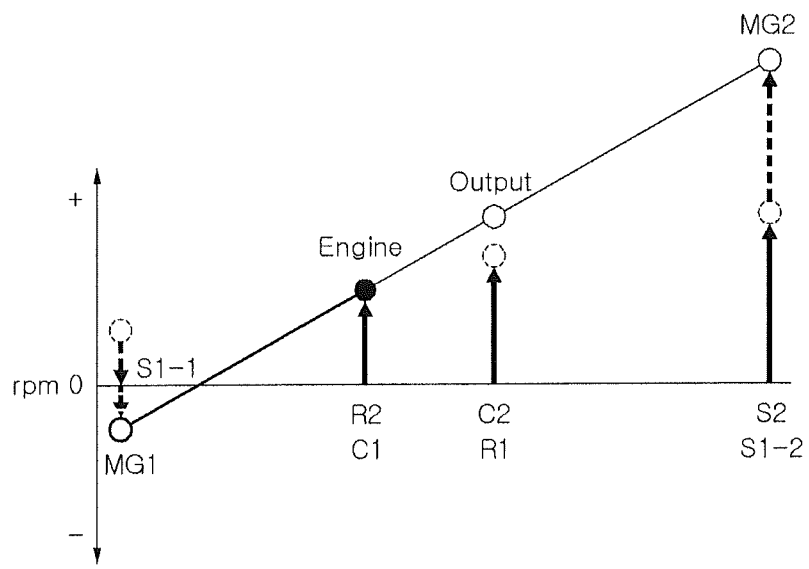

FIG. 7 illustrates the compound split mode. The compound split mode is implemented by engaging the first clutch CL1, in which the first planetary gear set 1 and the second planetary gear set 2 are integrated by the first clutch CL1, and, as shown in the figure, one lever is formed, such that driving is performed by the second motor generator MG2 and the engine ENGINE and the first motor generator MG1 generates electricity or circulates power, in accordance with circumstances.

Figure 8:
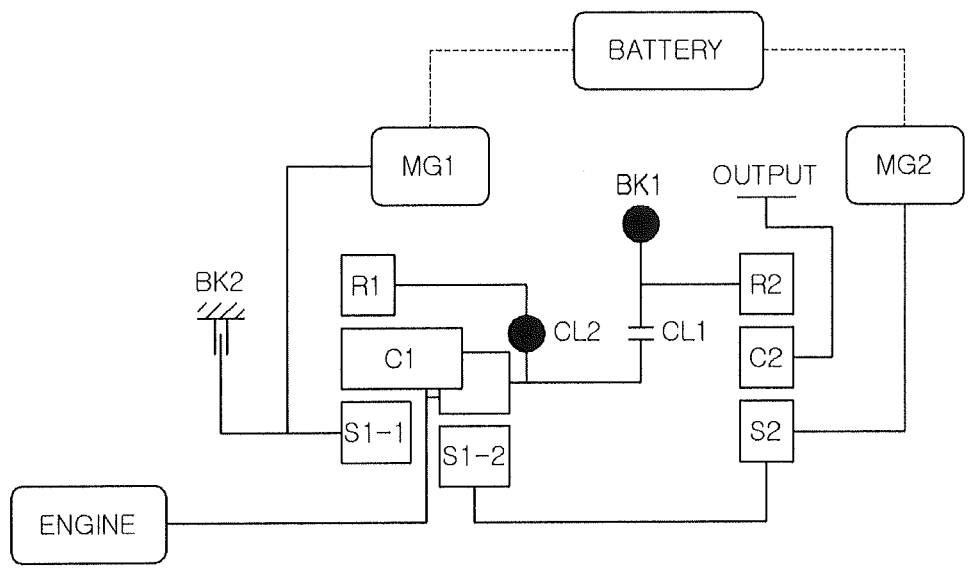
Figure 8:
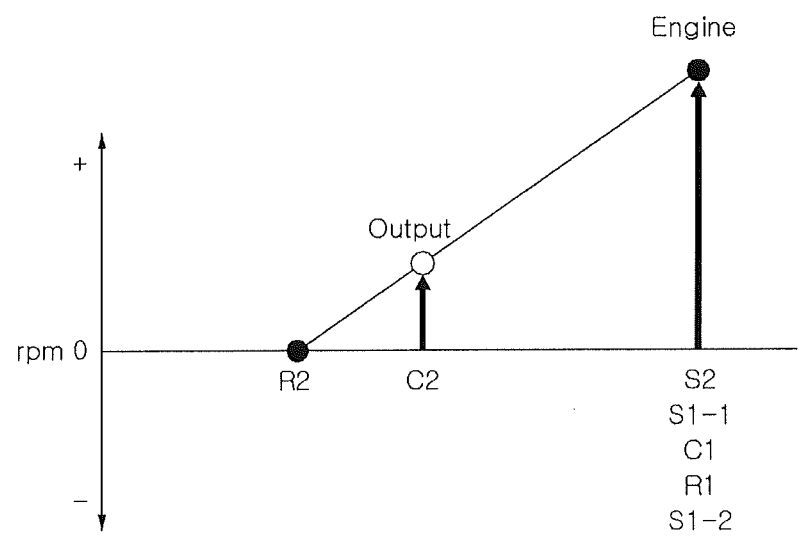

FIG. 8 illustrates the UD1 mode, which is implemented by engaging the first brake BK1 and the second clutch CL2.

The first planetary gear set 1 is integrated by engagement of the second clutch CL2 and the second ring gear R2 is fixed by engagement of the first brake BK1, such that the power of the engine ENGINE is supplied to the first carrier C1 and integrally rotates the entire the first planetary gear set 1, and this power drives the second sun gear S2 of the second planetary gear set 2 and is reduced across the second carrier C2 and then outputted. In this operation, the first motor generator MG1 and the second motor generator MG2 freely rotate with the engine ENGINE, in which the power of the engine ENGINE is reduced at a predetermined reduction gear ratio across the second planetary gear set 2 and then outputted.

Figure 9:
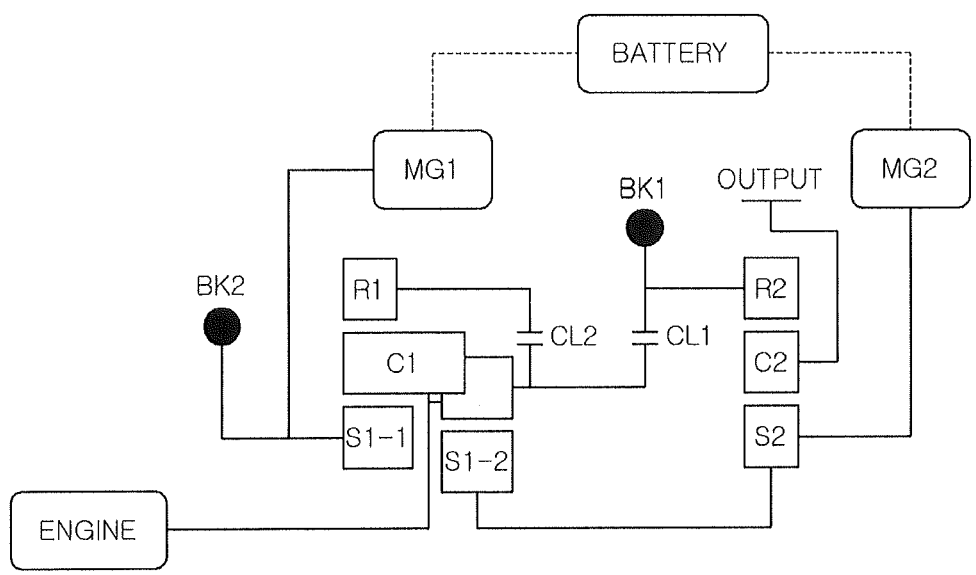
Figure 9:
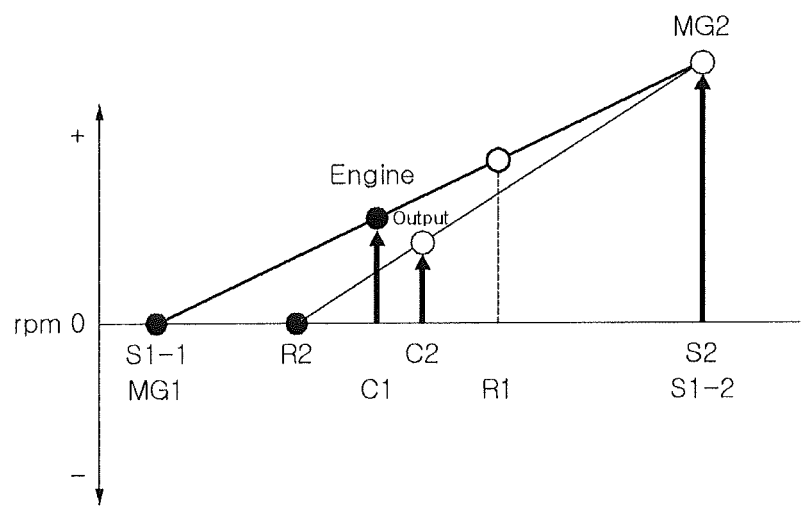

FIG. 9 illustrates the UD2 mode, which is implemented by engaging the first brake BK1 and the second brake BK2.

Since the first sun gear S1-1 is fixed, the power from the engine ENGINE is supplied to the second sun gear S2 of the second planetary gear set 2 through the first carrier C1 and the first sun gear S1-2, and the power of the second sun gear S2 is reduced across the second carrier C2 and then outputted.

Figure 10:
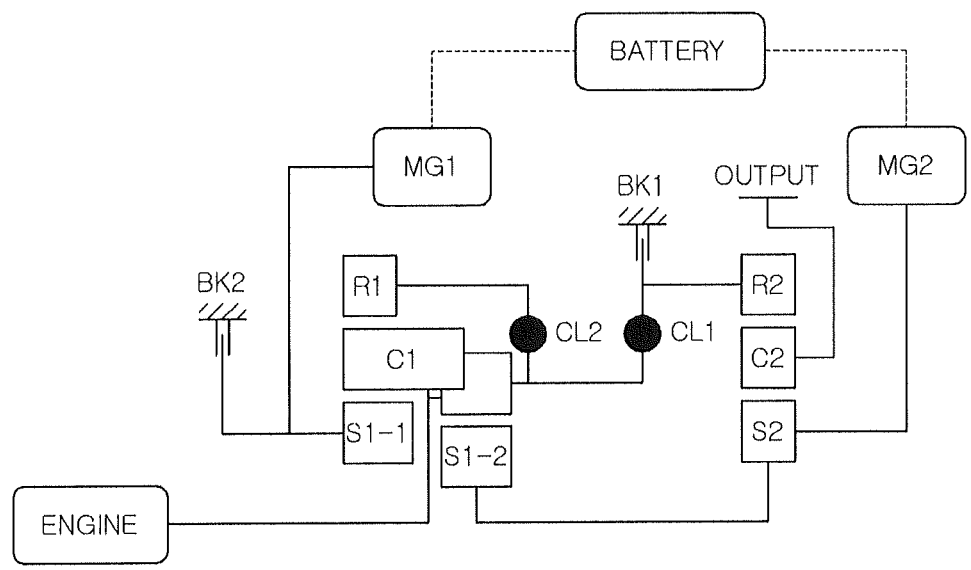
Figure 10:
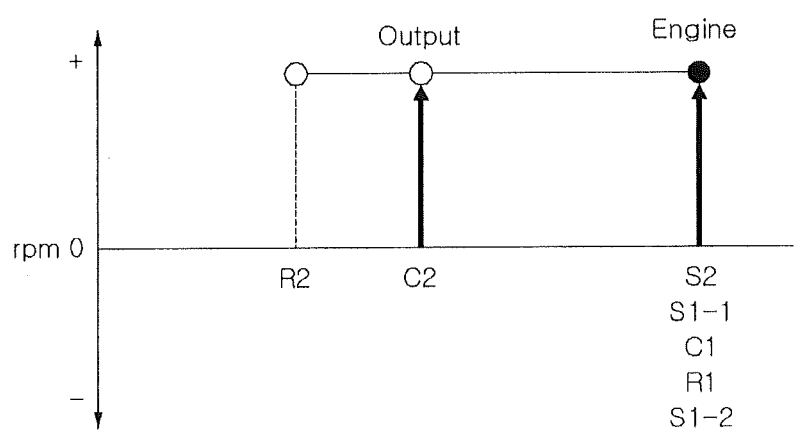

FIG. 10 illustrates the 1:1 mode, which is implemented by engaging the first clutch CL1 and the second clutch CL2. In this mode, the first planetary gear set 1 is integrated by the second clutch CL2 and the second planetary gear set 2 is integrated with the first planetary gear set 1 by the first clutch CL1. Accordingly, the power of the engine ENGINE which is inputted to the first carrier C1 is outputted without change to the output member OUTPUT through the second carrier C2.

Similarly, the first motor generator MG1 and the second motor generator MG2 freely rotate with the engine ENGINE.

Figure 11:
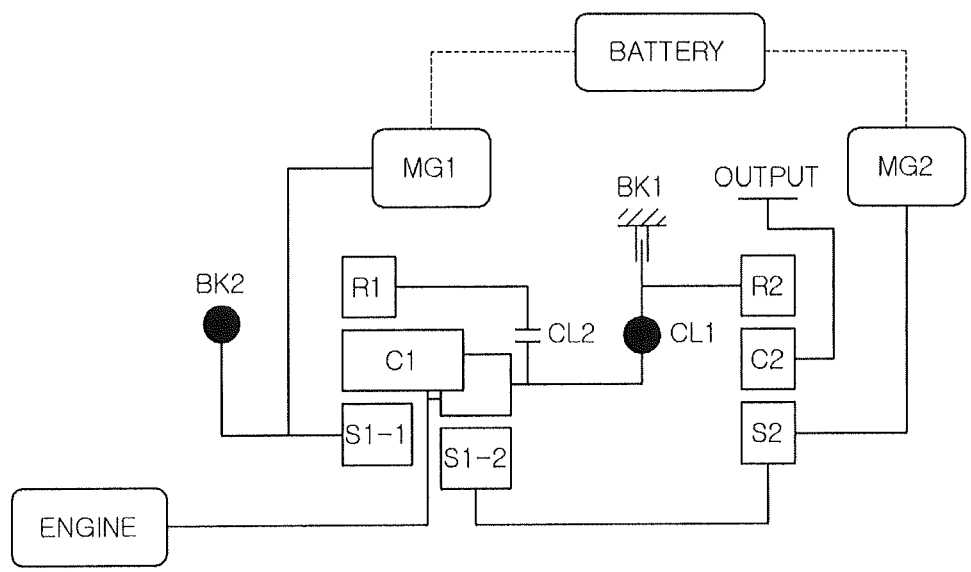
Figure 11:
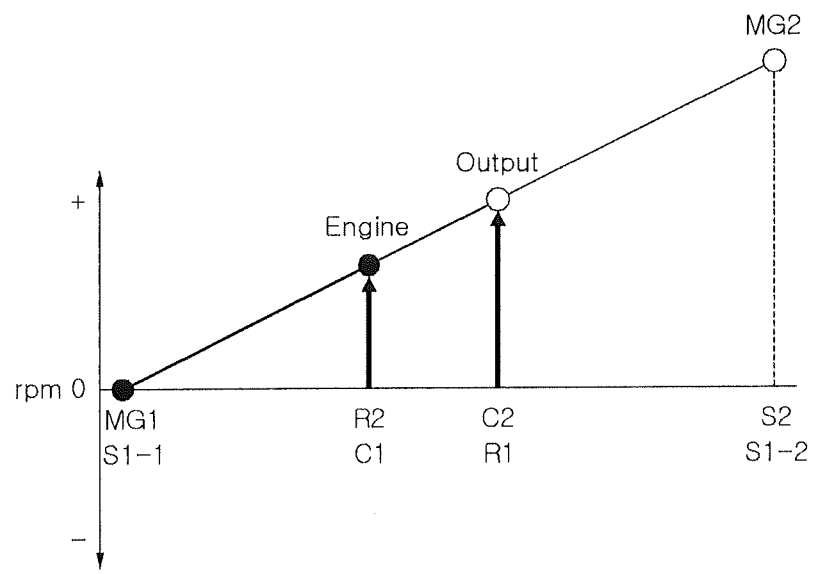

FIG. 11 illustrates the OD mode, which is implemented by engaging the second brake BK2 and the first clutch CL1.

That is, the first planetary gear set 1 and the second planetary gear set 2 form one lever by engagement of the first clutch CL1 and the first sun gear S1-1 is fixed by engagement of the second brake BK2. As a result the power of the engine ENGINE which is supplied to the first carrier C1 is supplied to the second ring gear R2, increased through the second carrier C2, and then outputted.

Meanwhile, FIG. 12 shows a table of operations modes of the second embodiment of FIG. 2, which includes an EV1 mode, an input split mode, a compound split mode, an UD mode, an 1:1 mode, and an OD mode.

The EV1 mode and the input split mode are implemented by engaging the first brake BK1, the compound mode is implemented by engaging the first brake CL1, and the UD mode is implemented by engaging the second clutch CL2 and the first brake BK1, and the 1:1 mode is implemented by engaging the first clutch CL1 and the second clutch CL2 and integrating the first planetary gear set 1 and the second planetary gear set 2. Further, the OD mode is implemented by engaging the first clutch CL1 and the second brake BK2.

Power flow and operation of this embodiment are substantially similar to the first embodiment of FIG. 1 and the description thereof is omitted.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a hybrid vehicle comprising: a first planetary gear set that includes at least four rotary members, including a rotary member connected to an engine and two rotary members selectively connected with each other; a second planetary gear set that includes at least three rotary members including a rotary member continuously connected to a rotary member of the first planetary gear set and a rotary member both connected to an output member and selectively connected to another rotary member of the first planetary gear set; a first fixing device that is provided to restrict rotation of a rotary member of the second planetary gear set other than the rotary member continuously connected to the rotary member of the first planetary gear set and the rotary member both connected to the output member and selectively connected to another rotary member of the first planetary gear set; a second fixing device that is provided to restrict rotation of a rotary member of the first planetary gear set other than the rotary members selectively connected with each other and the rotary member continuously connected with the rotary member of the second planetary gear set; a third torque transfer device that is disposed to selectively connect and disconnect a rotary member of the first planetary gear set and a rotary member of the second planetary gear set; a fourth torque transfer device that is disposed to selectively connect and disconnect two rotary members of the first planetary gear set; a first motor generator that is connected to a rotary member of the first planetary gear set; and a second motor generator that is connected to a rotary member of the second planetary gear set.

2. The transmission for a hybrid vehicle as defined in claim 1, wherein the first motor generator is continuously connected with a rotary member of the first planetary gear set other than the rotary members selectively connected with each other and the rotary member continuously connected to the rotary member of the second planetary gear set, and the second motor generator is continuously connected to the rotary member of the second planetary gear set connected to the rotary member of the first planetary gear set.

3. The transmission for a hybrid vehicle as defined in claim 2, wherein the first planetary gear set is a revenue type planetary gear set, the second planetary gear set is a simple planetary gear set, the first planetary gear set includes a 1-1 sun gear, a 1-2 sun gear, a first carrier, and a first ring gear, and the second planetary gear set includes a second sun gear, a second carrier, and a second ring gear.

4. The transmission for a hybrid vehicle as defined in claim 3, wherein the first fixing device and the second fixing device are a first brake and a second brake which can restrict rotation of the rotary members connected thereto, respectively, and the third torque transfer device and the fourth torque transfer device are a first clutch and a second clutch which can selectively connect and disconnect two rotary members that can relatively rotate.

5. The transmission for a hybrid vehicle as defined in claim 4, wherein the second clutch is disposed to selectively connect and disconnect the first carrier and the first ring gear of the first planetary gear set, the first brake is disposed to restrict rotation of the second ring gear, the second motor generator is continuously connected to the second sun gear, and the output member is connected to the second carrier.

6. The transmission for a hybrid vehicle as defined in claim 5, wherein the engine is connected to first ring gear, the first motor generator is continuously connected to the 1-2 sun gear, the 1-1 sun gear is continuously connected to the second sun gear, the first clutch selectively connect the first carrier with the second carrier; and the second brake is disposed to restrict rotation of the 1-2 sun gear.

\* \* \* \* \*